United States Patent
Panoushek et al.

[11] Patent Number: 5,993,312
[45] Date of Patent: Nov. 30, 1999

[54] AGRICULTURAL VEHICLE CAB AUTOMATIC TEMPERATURE CONTROL SYSTEM

[75] Inventors: Dale W. Panoushek, Orion, Ill.; Calvin J. Kraning; Curtis A. Halgrimson, both of Valley City, N. Dak.; Quentin L. Guhr, Colona, Ill.; Robert D. Doescher, Geneseo, Ill.; Alan G. Leupold, Plainfield, Ill.

[73] Assignee: Case Corporation, Racine, Wis.

[21] Appl. No.: 08/995,813

[22] Filed: Dec. 22, 1997

[51] Int. Cl.⁶ .................................. B60H 1/02; B60H 1/32
[52] U.S. Cl. ............................... 460/1; 460/119; 460/150; 237/2 A; 237/12.3 R
[58] Field of Search ............................ 460/1, 119, 150, 460/149; 56/10.2 R, DIG. 15; 237/2 A, 12.3 R; 364/424; 465/2, 16

[56] References Cited

U.S. PATENT DOCUMENTS

| | | |
|---|---|---|
| 3,682,240 | 8/1972 | Cira . |
| 4,192,456 | 3/1980 | Shields et al. . |
| 4,337,818 | 7/1982 | Franz . |
| 4,352,456 | 10/1982 | Brandenburg, Jr. . |
| 4,420,033 | 12/1983 | Franz . |
| 4,484,619 | 11/1984 | Franz . |
| 4,540,040 | 9/1985 | Fukumoto et al. . |
| 4,642,770 | 2/1987 | Shirley . |
| 4,819,715 | 4/1989 | Kobayashi . |
| 4,865,119 | 9/1989 | Okada et al. . |
| 4,914,924 | 4/1990 | Takahashi . |
| 5,085,267 | 2/1992 | Torrence . |
| 5,127,576 | 7/1992 | Weatherhead et al. . |
| 5,137,213 | 8/1992 | Yamamoto et al. . |
| 5,211,333 | 5/1993 | Schmalenbach et al. . |
| 5,226,595 | 7/1993 | Devera et al. . |
| 5,244,035 | 9/1993 | Iida et al. . |
| 5,259,814 | 11/1993 | Weissbrich et al. . |
| 5,344,070 | 9/1994 | Akasaka et al. . |
| 5,427,313 | 6/1995 | Davis, Jr. et al. . |
| 5,490,556 | 2/1996 | Pichotta ................................ 165/43 X |
| 5,538,472 | 7/1996 | Panoushek et al. . |
| 5,579,994 | 12/1996 | Davis, Jr. et al. . |
| 5,799,869 | 9/1998 | Pichotta ............................. 165/269 X |

FOREIGN PATENT DOCUMENTS

| | | |
|---|---|---|
| 79301430 | 7/1979 | European Pat. Off. . |
| 62-186871 | 7/1987 | Japan . |

*Primary Examiner*—Robert Pezzuto
*Attorney, Agent, or Firm*—Foley & Lardner

[57] ABSTRACT

A combine including an improved HVAC control system. The frame of the combine supports an operator cab, a harvesting head and the other operational systems of the combine. The control system includes an operator control and a heat exchanger located in the cab. The control system also includes at least one sensor disposed to sense at least one of an ambient air temperature, a cab air temperature and solar loading, and to produce at least one sensed signal representative thereof. The operator control is configured to produce a set-point signal representative of a desired cab air temperature. An interface circuit is electromagnetically coupled to the valve assembly, the operator control, and the at least one sensor. A cooling coil may also be located in the cab, wherein the interface circuit is electromagnetically coupled to the associated coolant compressor. The interface circuit produces a temperature differential based upon a comparison of the set-point signal to the at least one sensed signal and applies the electrical control signals to the valve, compressor and blower based upon the temperature differential to achieve the desired cab air temperature and minimize cab air temperature oscillations.

30 Claims, 12 Drawing Sheets

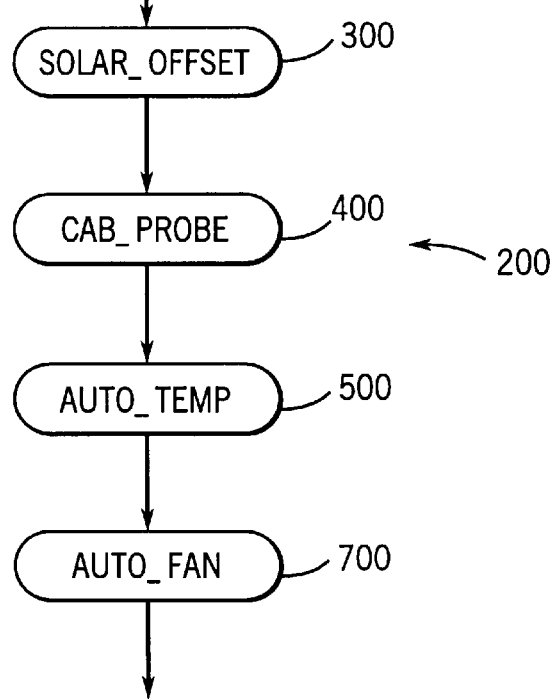
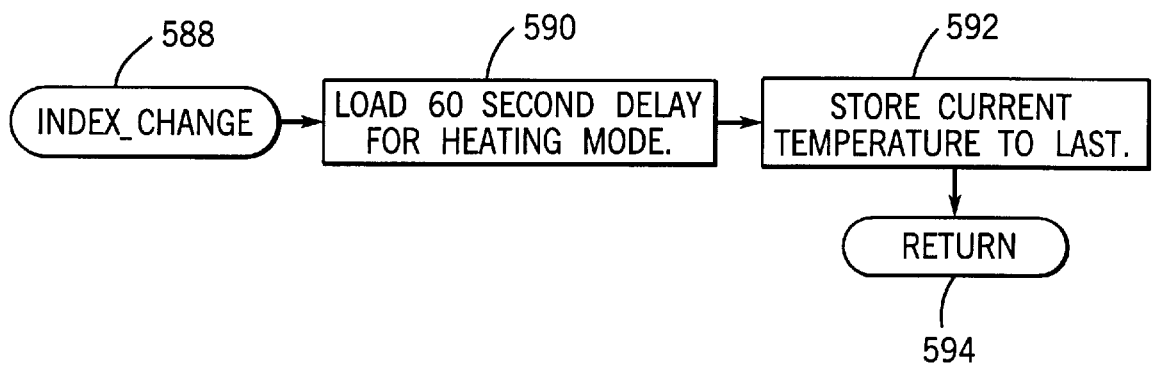

AGRICULTURAL VEHICLE CAB AUTOMATIC TEMPERATURE CONTROL SYSTEM

FIELD OF THE INVENTION

The present invention relates generally to temperature control in an agricultural vehicle. More particularly, this invention relates to automatically controlling the cab air temperature in an agricultural vehicle to a preselected value set on a manual control panel electrically linked to an energy transfer mechanism located in the cab.

BACKGROUND OF THE INVENTION

Operation of off-road and agricultural vehicles is simplified by locating operator controls which require viewing near the line of sight of the operator. As a result, heating and cooling controls, and the energy transfer mechanisms associated therewith (heating and cooling heat exchangers) in vehicles such as combines have conventionally been located at the center and top of the operator cab near the line of sight of the operator. In particular, the control knobs, the blower, and the heat exchangers are typically at the top and center of the cab. In this configuration, the blower and heat exchangers are positioned at the same location as the control knobs to simplify the mechanical link between the control knobs and the heat exchanger valves. Another reason the blower and heat exchangers are located at the top center of the cab is to provide a relatively efficient use of cab space.

Despite the advantages of locating the heating controls and associated heat transfer devices at the top and center of a cab, there are some disadvantages. One such disadvantage is that the cost of providing water and refrigerant lines to the coils is relatively high. More specifically, the hot water source (e.g., engine) and refrigerant source (e.g., compressor on the engine) in a combine are relatively distant from the top and center of the cab. However, if the heat exchangers and associated valves are displaced from the control knobs, the routing of the mechanical link therebetween becomes difficult and expensive. Another disadvantage caused by locating the heating coil at the top and center of the cab is the inability to effectively heat the lower portions of the cab, such as at the operator's feet.

U.S. Pat. No. 5,538,472 for "Agricultural Vehicle Cab Temperature Control System" discloses an agricultural vehicle such as a combine in which the heat exchangers are relocated from the typical location adjacent the heating controls at the top and center of the operator cab to a location such as below the operator seat, with the heating controls electromagnetically linked to the heat exchangers. This spacial arrangement allows the conduits for heat transfer fluid to be simplified because the heat exchangers are located closer to the heat source than in the prior art systems.

Operator comfort within the cab of an agricultural vehicle such as the one described in the above-identified patent may be affected by a number of external factors. For example, changes in ambient air temperature can lead to undesired changes in the cab air temperature, which decreases operator comfort. In addition, operator comfort in the cabs of such vehicles can be adversely influenced by solar loading on sunny days. This results from the functional cab design of such vehicles which requires large front and side windows to maximize visibility to crop as it enters the machine and good visibility to the sides. These front and side windows may extend from the floor to headliner, but behind the cab there may be only a small window to allow visibility into a grain tank which typically blocks sunlight from the rear. Thus, operator comfort in such cabs is significantly influenced by the position of the sun and the direction of travel. More particularly, the operator can feel the radiant heat from sunlight when traveling towards the sun or at right angles to the sun but does not feel it when traveling away from the sun.

In systems requiring manual setting of the heat energy output of the heat exchangers, operators may find it difficult or even impossible to continually monitor and change the settings as needed to compensate for such external influences and maintain a desired cab air temperature. Accordingly, it would be desirable to automatically control the amount of heating or cooling and the fan speed to maintain a constant, desired temperature in the cab without need for operator intervention.

SUMMARY OF THE INVENTION

The present invention relates to an agricultural vehicle such as a combine. The vehicle is typically coupled to an agricultural implement, and includes an operator cab supported by the vehicle frame and a heat exchanger assembly located in the cab. The heat exchanger assembly may be coupled to a heated fluid source displaced from the cab and/or a cooled fluid source displaced from the cab. To control the temperature of the cab, the heat exchanger assembly is configured to transfer varying amounts of heat energy. To vary the heat energy, the heat exchanger assembly may include heat exchangers with the heated or cooled fluid supplied thereto for heating or cooling the cab. An electrically operated valve assembly including at least one electrical input couples the fluid source to the heat exchanger assembly. The valve controls the flow of fluid from the source to the heat exchanger in response to electrical control signals applied to the electrical input. An operator control is located in the cab and includes an operator interface configured to produce a set-point signal representative of a desired cab air temperature. At least one sensor is disposed to sense at least one of an ambient air temperature, a cab air temperature and solar loading, and to produce at least one sensed signal representative thereof. An interface circuit is electromagnetically coupled to the valve assembly, the operator control, and the at least one sensor. The interface circuit produces a temperature differential based upon a comparison of the set-point signal to the sensed signals and applies the electrical control signals to the valve based upon the temperature differential to achieve the desired cab air temperature and minimize cab air temperature oscillations.

The present invention further relates to an agricultural vehicle including harvesting means and an operator cab supported by a vehicle frame and wheels. The vehicle also includes a supply means for providing a source of fluid to an energy transfer means located in the cab. A valve means couples the energy transfer means to the supply means and controls the flow of fluid to the energy transfer means in response to electrical control signals, thereby allowing the energy transfer means to supply or remove heat energy from the cab. A control means located in the cab is operable by a user for producing a set-point signal representative of a desired cab temperature. A sensor means is disposed for sensing at least one of an ambient air temperature, a cab air temperature and solar loading, and for generating sensed signals representative thereof. An interface means is coupled to the valve means, the control means and the sensor means to apply electrical control signals to the valve means based upon the temperature difference between the set-point signal and the sensed signals to achieve the desired cab temperature and minimize cab air temperature oscillations.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art. For example, the invention may be embodied in off-road work vehicles such as tractors and combines.

BRIEF DESCRIPTION OF THE DRAWINGS

The preferred exemplary embodiment of the invention will hereinafter be described in conjunction with the appended drawings, wherein like numerals denote like elements and:

FIG. 3 is a logic flow diagram of the main loop of a temperature control algorithm loop executed by the microprocessor employed in the controller of FIG. 2;

FIG. 10 is a logic flow diagram of a subroutine for updating program variables following a change in the temperature index;

DETAILED DESCRIPTION OF TEMPERATURE CONTROL SYSTEM

The present invention relates generally to a temperature control system for a cab of an agricultural vehicle. More particularly, this invention relates to a system for automatically controlling the cab air temperature in an agricultural vehicle to a preselected value set by a user on a control panel. The system automatically controls the heat transfer from one or more heat exchangers and/or the speed of a blower to achieve the desired cab temperature and minimize cab air temperature oscillations.

Figure 1:
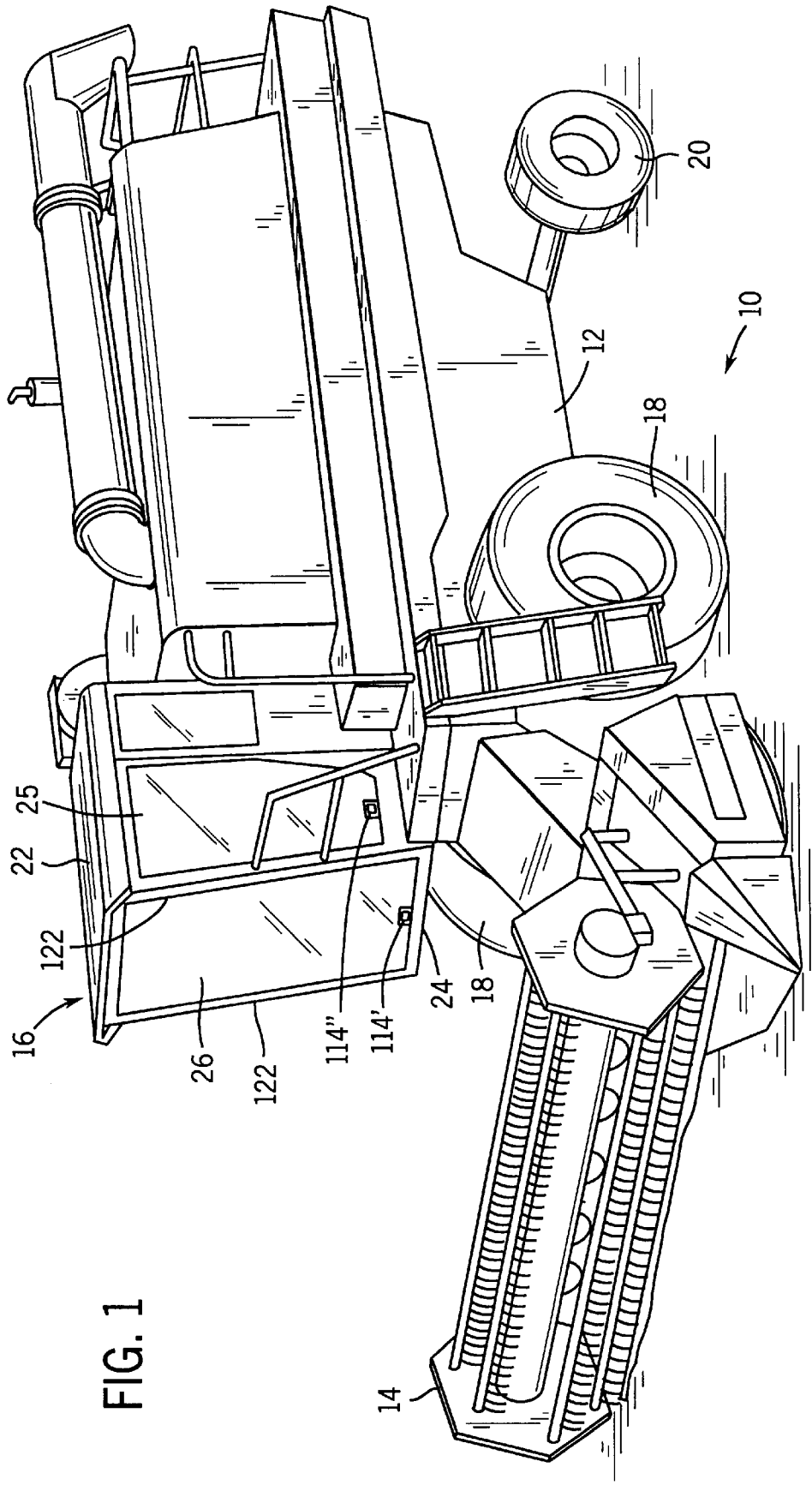
FIG. 1 illustrates a combine including an embodiment of a temperature control system of the present invention.

Referring to FIG. 1, the temperature control system is used in combination with an agricultural vehicle indicated generally as 10. Vehicle 10 includes a vehicle frame 12, which supports an agricultural implement 14 for harvesting crop, and an operator cab 16 at a location elevated above implement 14. Frame 12 is supported by a plurality of tires 18 and 20. Operator cab 16 has a roof 22, a floor 24, a pair of side windows 25 and a front window 26 extending between roof 22 and floor 24. Vehicle 10 moves in a first direction when crop harvesting implement 14 is operational for harvesting, and implement 14 and cab 16 are generally located at the front of vehicle 10 relative to the first direction.

Figure 2:
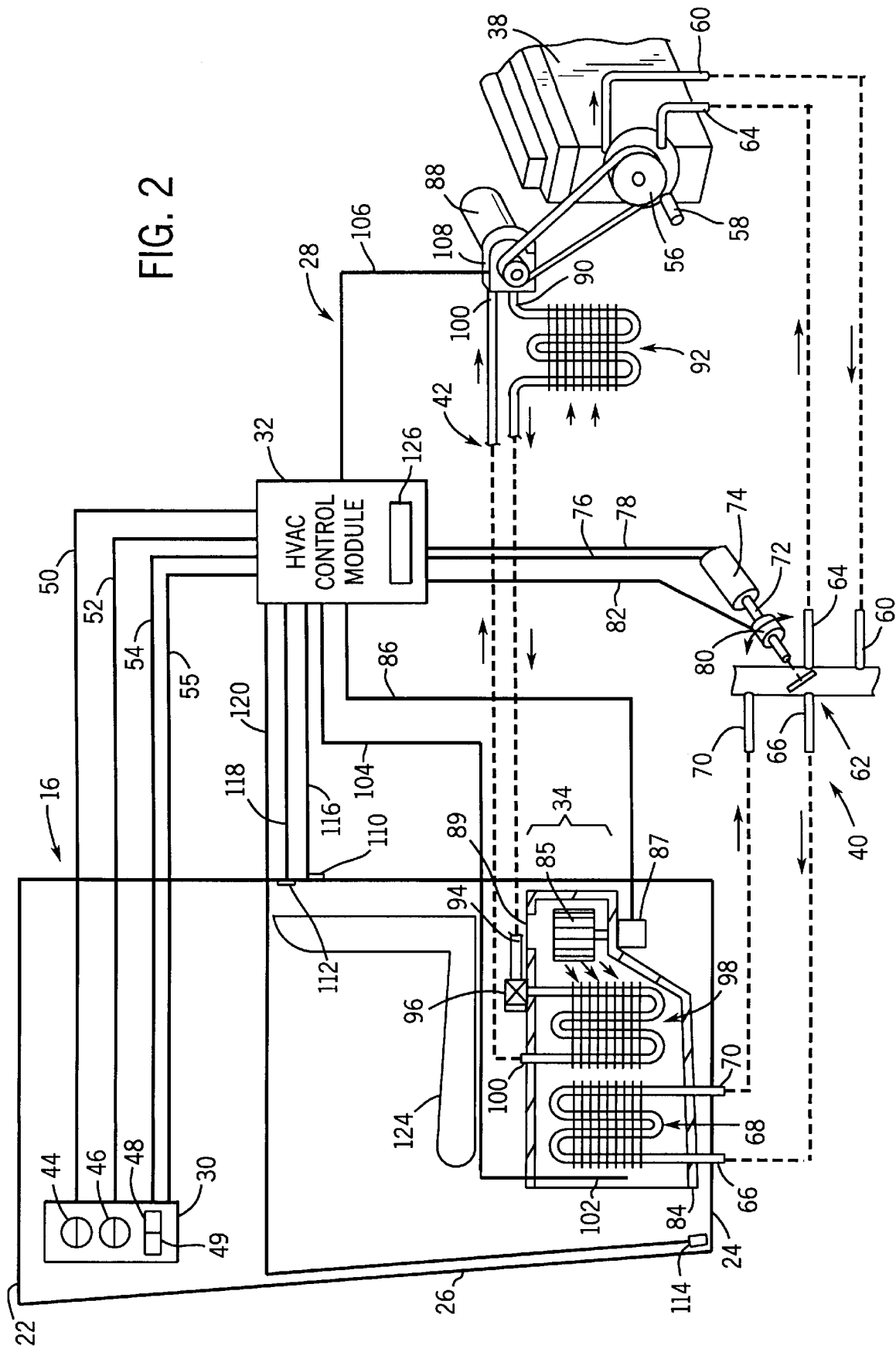
FIG. 2 illustrates the temperature control system.

Referring now to FIG. 2, a heating valve and air conditioning (HVAC) automatic temperature control system is indicated generally as 28. Temperature control system 28 includes an operator control 30, an HVAC control module 32, a blower system 34, an engine 38, a heating circuit 40, and a cooling circuit 42. System 28 may be set by an operator to function in either a manual temperature (or climate) control mode or an automatic temperature (or climate) control mode. Broadly stated, an occupant of cab 16 manipulates operator control 30 to send heat energy output signals (in manual control mode) or set-point temperature signals (in automatic control mode) to HVAC control module 32. Module 32 then applies control signals to heating circuit 40, cooling circuit 42, and blower system 34 for controlling the temperature and volume of air blown into cab 16 to control the comfort level therein.

Operator control 30 is provided with user input devices including a rotatable temperature command signal generator 44, a rotatable blower fan speed command signal generator 46, an air conditioning (A/C) on/off switch 48, and an automatic temperature control (ATC) on/off switch 49. In the presently preferred embodiment, generators 44 and 46 include rotary potentiometers of generally known type; however, any suitable device for providing a variable command signal can be used. Generators 44 and 46 apply analog temperature and blower control signals, respectively, to HVAC module 32 along conductors 50 and 52, respectively. A/C switch 48 applies digital A/C control signals to module 32 along a conductor 54, and ATC switch 49 applies digital ATC control signals to module 32 along a conductor 55.

Engine 38 is supported by frame 12 and provides a heat source for a heat transfer fluid such as an antifreeze mixture. An engine driven water pump 56 receives heat transfer fluid from the engine cooling radiator through a conduit 58 and discharges heat transfer fluid to internal passages of engine 38. Water pump 56 has an auxiliary outlet which provides the flow of heat transfer fluid through a conduit 60 to the inlet of a butterfly control valve 62. Water pump 56 also has an auxiliary return which receives a return flow of heat transfer fluid through a conduit 64 from valve 62. Control valve 62 has an auxiliary outlet connected through a conduit 66 to an inlet of a heater core 68 for providing the flow of heat transfer fluid thereto. The heat transfer fluid is circulated through heater core 68 and is returned to an auxiliary inlet of valve 62 through a conduit 70.

Control valve 62 is operatively connected to a rotatable shaft 72 driven by a valve motor 74 (e.g., a stepping motor or D.C. motor with appropriate gearing). Motor 74 receives valve rotation control signals from HVAC module 32 along conductors 76 and 78 and appropriately rotates shaft 72 in a clockwise or counter-clockwise rotation for controlling the amount of heat transfer fluid flowing through heater core 68. As control valve 62 is rotated by motor 74, a position feedback module 80 generates an analog valve position signal that is sent to HVAC control module 32 along a lead 82. In the presently preferred practice, position feedback module 80 includes a rotary potentiometer with its wiper connected to move with shaft 72 for sensing the rotary position thereof.

A blower housing 84 positioned near floor 24 of cab 16 houses heater core 68 and blower system 34.

Blower system 34 includes a blower 85 located in one end of housing 84 and a blower motor 87 which drives blower 85. Blower 85 draws in air through a vent 89 and discharges the air over heater core 68 and into cab 16.

Heater core 68 is heated upon circulation of the heat transfer fluid and thereby heats air blown over heater core 68. Blower motor 87 receives blower motor control signals along a conductor 86 from HVAC control module 32. In the present embodiment, the blower motor signal is a PWM signal with a frequency of 16 KHz and a duty cycle ranging from 18.75% to 100% in 6.25% increments, resulting in 14 speeds.

For purposes of cooling circuit 42, engine 38 is appropriately coupled to a compressor 88 (e.g., via a belt and pulley drive) to impart rotational motion thereto. Compressor 88 compresses a refrigerant such as ammonia or Freon, which is then directed out of compressor 88 through a conduit 90. Conduit 90 leads to an inlet of an ambient condenser 92, typically located in front of the engine cooling radiator. Condenser 92 liquifies the high pressure refrigerant supplied by compressor 88 and directs the liquified refrigerant through a conduit 94. Conduit 94 leads to an inlet of a thermal expansion valve 96 of an evaporator 98. Evaporator 98 then directs the refrigerant through a conduit 100 for return of re-vaporized refrigerant to compressor 88.

Evaporator 98 is disposed in blower housing 84 between blower 85 and heater core 68. Evaporator 98 is cooled upon expansion of the refrigerant supplied thereto by expansion valve 96 and cools air blown through evaporator 98 with the assistance of blower 85. A discharge air temperature sensor 102 in the form of a thermistor is disposed adjacent the downstream edge of refrigerant evaporator 98 for sensing the temperature of the air passing over evaporator 98. Temperature sensor 102 generates analog evaporator temperature signals which are sent to HVAC control module 32 along a conductor 104. HVAC module 32 sends control signals to compressor 88 along a lead 106 to control engagement and disengagement of a compressor clutch 108.

HVAC control system 28 is provided with a number of sensors disposed to sense various environmental factors that may affect operator comfort within cab 16. More specifically, system 28 preferably includes at least one ambient (or outside) air temperature sensor 110, at least one cab (or internal) air temperature sensor 112, and at least one solar loading sensor 114. Sensors 110, 112 and 114 generate ambient air temperature $t_{air}$, cab air temperature $t_{cab}$ and solar loading $V_{sol}$ analog signals, respectively, which represent the sensed values, and which are monitored by HVAC module 32 along respective conductors 116, 118 and 120.

Solar loading sensor(s) 114 is (are) disposed to sense the intensity of radiant sunlight admitted through front window 26 and side windows 25 to estimate the current solar load on the operator's body. Placement of solar sensor(s) 114 within cab 16 is important to ensure system 28 reacts neither too early nor late when a change in solar load is felt by the operator. Preferably, a sensor 114' (see FIG. 1) is placed near floor 24 adjacent front window 26 to allow system 28 to react when driving directly into the sun, particularly as strong mid day sunlight starts to shine on the operator's feet, ankles and shins. When the sun is lower in the horizon, front sensor 114' detects the sun when the largest amount of the operator's body (e.g., feet, legs, chest) is subjected to sunlight. However, the front window location may be shaded by front structural posts 122 of cab 16, the steering column (not shown), or the operator's body when the sun is off to the side. To compensate for this possibility, system 28 preferably includes a pair of sensors 114" (connected in parallel with sensor 114'), with one facing each side window 25. Side sensors 114" are preferably placed 12 to 18 inches above floor 24, which is higher than front sensor 114' because a smaller percentage of the operator's body is exposed to strong midday sunlight from the side, i.e., the operator's profile is smaller from the side than the front.

Operator control 30 is located in cab 16 generally at roof 22 above front window 26. An operator seat 124 is supported at floor 24 of cab 16 above blower housing 84 (i.e., above heater core 68, refrigerant evaporator 98 and blower system 34). This spacial arrangement within cab 16 eliminates the need to direct antifreeze and refrigerant lines to roof 22 while still allowing control 30 to be visible and readily accessible to an operator of vehicle 10.

HVAC control module 32 preferably includes an appropriately configured microprocessor 126 including circuitry for analog-to-digital conversion, PWM signal generation, amplification and filtering. HVAC control module 32 is disposed to monitor the signals generated by the user input devices of operator control 30 including the analog temperature and blower control signals and the digital A/C and ATC control signals. In addition, HVAC module 32 monitors the sensed valve position and evaporator temperature signals. As will be described in detail below, HVAC module 32 also monitors the sensed environmental signals when the ATC control signal is high. In response to the aforementioned input signals, HVAC module 32 applies representative output blower motor signals, heater valve rotation signals and compressor clutch signals.

The operation of HVAC temperature control system 28 will now be discussed. Control system 28 is in manual temperature control mode when the ATC control signal is low and automatic temperature control mode when the ATC control signal is high. At the start up of system 28 (typically, when the ignition is turned on) control module 32 calibrates water butterfly valve position sensor 80 by fully closing butterfly valve 62 and reading the corresponding valve position signal. If system 28 calls for heat, whether in manual or automatic control mode, module 32 then fully opens valve 62 and reads the corresponding valve position signal again.

Turning first to the manual temperature control mode, blower command signal generator 46 may be rotated between a fully clockwise position and a predetermined angle (e.g., 40° of rotation) for maximum to minimum fan speed. If blower command signal generator 46 is off, then HVAC control module 32 will close water butterfly valve 62 or turn off compressor 88 if one or both of them are on.

If blower command signal generator 46 is on and temperature command signal generator 44 is set from a predetermined angle θ° (e.g., 45°) counter-clockwise of center to fully clockwise (e.g., 0°), where fully clockwise is maximum heat, HVAC control module 32 turns on water valve motor 74 to open water butterfly valve 62. When butterfly position sensor 80 equals the temperature command, HVAC control module 32 turns off valve motor 74. If generator 44 is set between θ° and fully counter-clockwise, water butterfly valve 62 is closed.

If blower command signal generator 46 and A/C switch 48 are on and if generator 44 is set between angle θ° and fully counter-clockwise, where fully counter-clockwise is maximum cooling, HVAC control module 32 turns on compressor 88. When temperature sensor 102 equals the temperature command, HVAC control module 32 turns off compressor 88. If generator 46 and A/C switch 48 are on and if generator 44 is set between θ° and fully clockwise, both heater water valve 62 and compressor 88 are on at the same time.

Turning now to the automatic temperature control (ATC) mode, system 28 will be in ATC mode when the ATC control signal is high and the blower command signal generator 46 is not off. The temperature control setting range is from 65° F. to 85° F. in 1° F. increments. In ATC mode, the heating or A/C will be turned on, increased or decreased when control module 32 determines that a temperature differential $t_{dif}$ between a set-point (or desired) temperature $t_{set}$, set by the operator on temperature generator 44, and the sensed (or actual) cab air temperature $t_{cab}$ is 0.7° F. or greater. For cooling, to achieve and maintain $t_{cab}$ at about $t_{set}$, module 32 checks $t_{cab}$ every 10 seconds and adjusts the evaporator temperature setting accordingly, subject to a minimum compressor off time of 10 seconds and no more than 4 on/off cycles per minute. For heating, $t_{cab}$ is checked every 10 seconds, and heater valve 62 is adjusted at a maximum of 1 minute intervals.

At power-up, if $t_{cab}$ is at least a predetermined amount (e.g. 4.2° F.) less than tset, the fan speed will be set at speed 7 and compressor 88 will be off. Limiting the fan speed and leaving compressor 88 off for an initial period after power-up allows the heater core to warm up faster. Once $t_{cab}$ rises 4° F. above the cab temperature measured at power-up, compressor 88 can be turned on and the fan speed will be set as follows. For $t_{dif}$ of less than 4.2° F., the fan speed will be the greater of speed 7 or a set-point (or desired) fan speed $f_{set}$ set by the operator on blower command generator 46. For $t_{dif}$ of about 4.2° F., the fan speed will be increased by 1 speed above $f_{set}$ plus an additional 1 speed (up to maximum) for each additional $t_{dif}$ of about 2.8° F.

If the A/C is at its maximum cooling capability and $t_{cab}$ is at least 0.7° F. above $t_{set}$, the fan speed will be increased by 1 speed if it is not already at maximum. If these conditions maintain, the first fan speed increase will occur within 10 to 30 seconds, and each additional fan speed increase will occur in 30 second increments thereafter. If the heating is at its maximum heating capability and $t_{cab}$ is at least 0.7° F. below $t_{set}$, the fan speed will increase by 1 speed if it is not already at maximum. If these conditions maintain, the first fan speed increase will occur within 10 seconds to 2 minutes, and each additional fan speed increase will occur in 3 minute increments thereafter. In ATC mode, the fan speed may at times be above the operator setting $f_{set}$, but will never be lower than $f_{set}$ except possibly at power-up when it may be limited to speed 7 as described above.

In ATC mode, module 32 also monitors solar sensor(s) 114. If the sun is detected, the temperature setting is lowered by a solar offset amount and the fan speed may also be increased. The first temperature setting decrease will occur within 2 seconds of detecting the sun, and each additional temperature setting decrease will occur in 10 second increments thereafter. However, if the time since the last solar increase is more than 1 minute, the next temperature setting decrease will occur within 2 seconds. As the sun decreases in intensity or is not detected, the temperature setting will increase to the required level in 2 second increments.

Turning now to FIGS. 3–14, the logic by which module 32 controls the cab air temperature $t_{cab}$ when system 28 is in ATC mode will be discussed. Referring first to FIG. 3, a portion of an algorithm for generating temperature control signals includes four routines executed in a continuous loop 200 which repeats every 131 milliseconds. Specifically, loop 200 includes a solar_offset routine 300, a cab_probe routine 400, an auto_temp routine 500 and an auto_fan routine 700. Solar_offset routine 300 and auto_fan routine 700 are executed during every loop, while cab_probe routine 400 and auto_temp routine 500 are executed at 10 second intervals.

Figure 4:
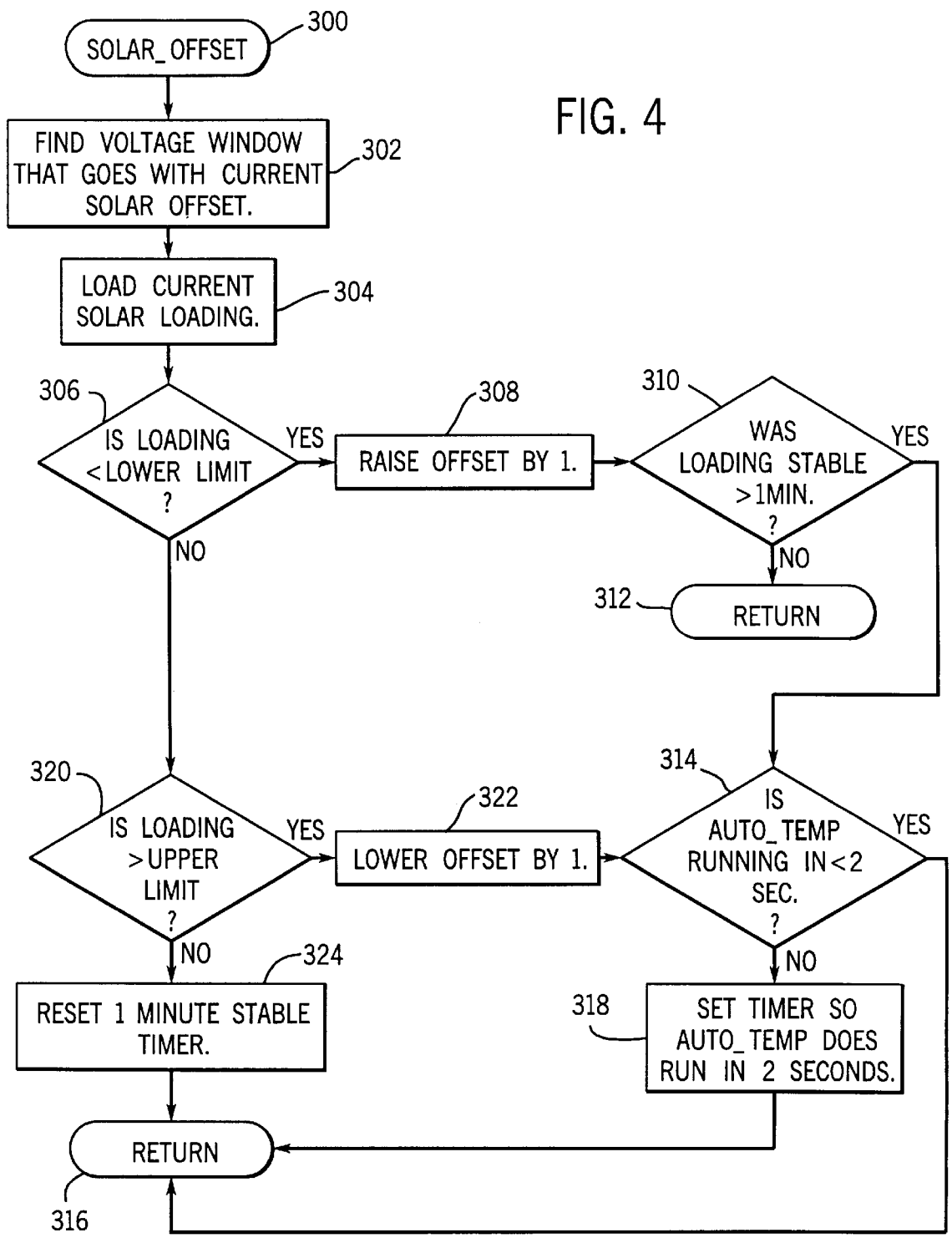
FIG. 4 is a logic flow diagram of a routine for determining a temperature offset to compensate for solar loading.

Referring now to FIG. 4, solar_offset routine 300 starts with a step 302 which looks up an upper and a lower limit (which together form a voltage window) corresponding to a solar or goal offset (initialized to 0 at power-up) from the following voltage table:

| Voltage Window for Three Sensors | Goal Offset |
| --- | --- |
| 1.94V and higher | 0 |
| 1.42V to 2.02V | 1 |
| 0.90V to 1.50V | 2 |
| 0.58V to 0.98V | 3 |
| 0.00V to 0.66V | 4 |

In a step 304, solar loading sensor(s) 114 are monitored, and the measured solar loading is loaded into a variable $V_{sol}$. A subsequent step 306 then checks whether $V_{sol}$ is less than the lower limit of the voltage window for the goal offset and, if so, the goal offset is raised by 1 at a step 308. Continuing along this route, a step 310 checks whether $V_{sol}$ has remained in the same voltage window for more than 1 minute and, if not, the routine returns at 312. On the other hand, if $V_{sol}$ has been stable for more than 1 minute, a step 314 checks whether auto_temp routine 500 will be running in less than 2 seconds. If yes, the routine returns at 316 and, if not, a step 318 sets a timer which causes auto_temp routine 500 to run in 2 seconds, and the routine then returns at 316.

Referring back to step 306, if $V_{sol}$ is not less than the lower limit of the voltage window, the routine proceeds to a step 320 which checks whether $V_{sol}$ is greater than the upper limit of the voltage window. If so, the goal offset is lowered by 1 at a step 322, and the routine then continues with step 314. If, however, $V_{sol}$ is between the inclusive lower and upper limits, the 1 minute stable timer is reset at a step 324 and the routine returns at 316.

Figure 5:
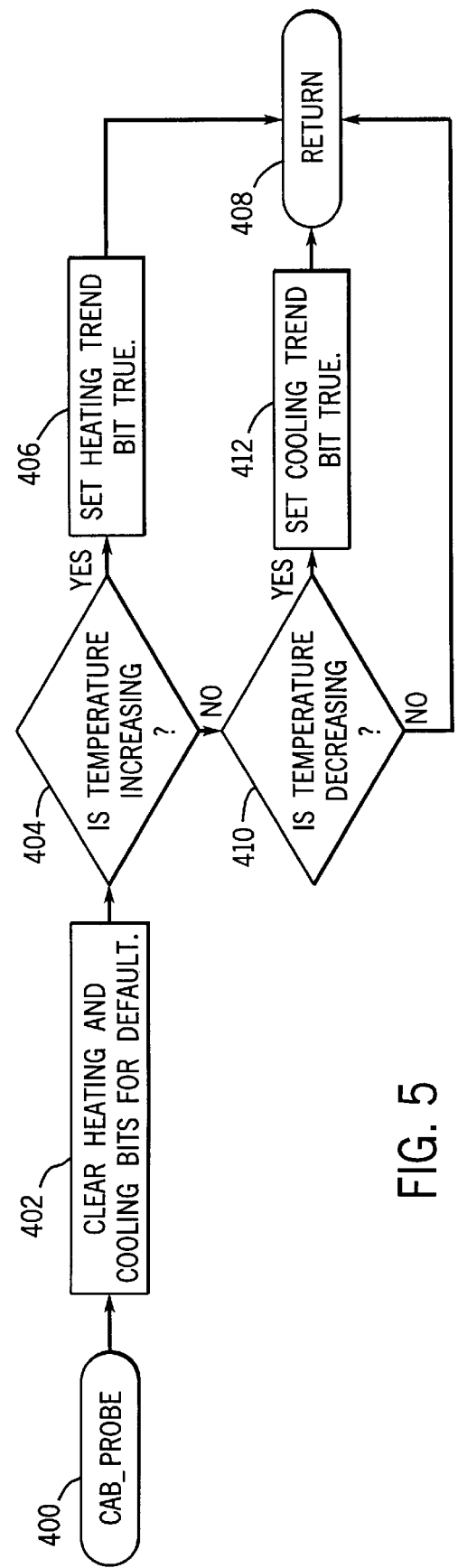
FIG. 5 is a logic flow diagram of a routine for determining a cab air temperature trend.

Turning next to FIG. 5, cab_probe routine 400 starts with a step 402 which clears the heating bits (namely, a heating_trend bit and a too_hot bit) and the cooling bits (namely, a cooling_trend bit and a too_cold bit) to default values (e.g., false). In a following step 404, the routine checks whether the actual cab air temperature $t_{cab}$ is increasing (i.e., whether the present $t_{cab}$ is greater than the previously $t_{cab}$). If yes, the heating_trend bit is set to true in a step 406 and the routine returns at 408. If $t_{cab}$ is not increasing, a step 410 checks whether it is decreasing (i.e., whether the current $t_{cab}$ is less than the previous $t_{cab}$) and, if yes, the cooling_trend bit is set to true in a step 412 and the routine returns at 408. If $t_{cab}$ is neither increasing nor decreasing, the routine simply returns at 408.

Referring now to FIGS. 6–13, auto_temp routine 500 will be described. Routine 500 controls the values of a temperature index $t_{ind}$ and a fan index $f_{ind}$, both of which index one row (ranging from 0 to 46) of the following table:

| | | MANUAL SETTING | | |
|---|---|---|---|---|
| row | Control Pot (V) | Fan Speed | Evap. Temp (° F.) | Percent Heater Closed | ATC Setting (° F.) |
| 0 | 0.569 | OFF | 34 | 100 | 65 |
| 1 | 0.686 | OFF | 34 | 100 | 65 |
| 2 | 0.804 | OFF | 34 | 100 | 65 |
| 3 | 0.922 | OFF | 34 | 100 | 66 |
| 4 | 1.020 | OFF | 35 | 100 | 66 |
| 5 | 1.118 | 1 | 37 | 100 | 67 |
| 6 | 1.216 | 1 | 39 | 100 | 67 |
| 7 | 1.314 | 1 | 40.5 | 100 | 67 |
| 8 | 1.392 | 2 | 42.5 | 100 | 68 |
| 9 | 1.471 | 2 | 44.5 | 100 | 68 |
| 10 | 1.549 | 2 | 46.5 | 100 | 69 |
| 11 | 1.627 | 3 | 48.5 | 100 | 69 |
| 12 | 1.706 | 3 | 51 | 100 | 69 |
| 13 | 1.765 | 3 | 53 | 100 | 70 |
| 14 | 1.824 | 4 | 54 | 100 | 70 |
| 15 | 1.882 | 4 | 56 | 100 | 71 |
| 16 | 1.941 | 4 | 49 | 95 | 71 |
| 17 | 2.000 | 5 | 49.5 | 94 | 71 |
| 18 | 2.059 | 5 | 50.5 | 93 | 72 |
| 19 | 2.118 | 5 | 51 | 92 | 72 |
| 20 | 2.176 | 6 | 52 | 91 | 73 |
| 21 | 2.235 | 6 | 52.5 | 90 | 73 |
| 22 | 2.275 | 6 | 53 | 89 | 73 |
| 23 | 2.314 | 7 | 53.5 | 88 | 74 |
| 24 | 2.373 | 7 | 55 | 87 | 74 |
| 25 | 2.412 | 7 | 56 | 86 | 75 |
| 26 | 2.451 | 8 | 57.5 | 85 | 75 |
| 27 | 2.490 | 8 | 59.5 | 84 | 76 |
| 28 | 2.529 | 8 | 61 | 82 | 76 |
| 29 | 2.569 | 9 | 63 | 79 | 77 |
| 30 | 2.597 | 9 | 64 | 76 | 77 |
| 31 | 2.647 | 9 | 66.5 | 73 | 78 |
| 32 | 2.686 | 10 | 66.5 | 70 | 78 |
| 33 | 2.725 | 10 | 66.5 | 66 | 79 |
| 34 | 2.745 | 10 | 66.5 | 62 | 79 |
| 35 | 2.748 | 11 | 66.5 | 58 | 80 |
| 36 | 2.804 | 11 | 66.5 | 53 | 80 |
| 37 | 2.843 | 11 | 66.5 | 48 | 81 |
| 38 | 2.863 | 12 | 66.5 | 43 | 81 |
| 39 | 2.902 | 12 | 66.5 | 38 | 82 |
| 40 | 2.922 | 12 | 66.5 | 32 | 82 |
| 41 | 2.961 | 13 | 66.5 | 26 | 83 |
| 42 | 2.980 | 13 | 66.5 | 20 | 83 |
| 43 | 3.000 | 13 | 66.5 | 14 | 84 |
| 44 | 3.020 | 14 | 66.5 | 8 | 84 |
| 45 | 3.039 | 14 | 66.5 | 0 | 85 |
| 46 | >3.09 | 14 | 66.5 | 0 | 85 |

The above table maps the potentiometer voltages generated by temperature command signal generator 44 and blower command signal generator 46 to appropriate settings for the fan speed, evaporator temperature, and percent heater closed. Control module 32, while executing another routine, then sends control signals to water valve motor 74 and compressor 88 based upon the values listed in the appropriate columns of the row indexed by $t_{ind}$, and to blower motor 87 based upon the value listed in the appropriate column of the row indexed by $f_{ind}$.

Before describing auto_temp routine 500 further, it is worth contrasting how the temperature and fan indexes $t_{ind}$, $f_{ind}$ are controlled in the manual control mode versus the ATC control mode. In manual mode, the operator manipulates the temperature and blower signal generators 44 and 46 to directly control the values of the temperature and fan speed indexes $t_{ind}$ and $f_{ind}$, respectively. That is, module 32 simply reads the potentiometer voltages from generators 44 and 46 and sets $t_{ind}$ and $f_{ind}$ to the row numbers corresponding to the potentiometer voltages. By contrast, when ATC mode is activated temperature index $t_{ind}$ is initialized to the row number corresponding to $t_{set}$, but thereafter is incremented and decremented by module 32 executing the logic of routine 500. Similarly, fan index $i_{fan}$ is initialized during power-up as described above, and thereafter its value is set by module 32 to equal the row number corresponding to $f_{set}$ plus a fan compensation fcomp (calculated and set by auto_temp routine 500 and auto_fan routine 700, as described below). Accordingly, it should be clear that in ATC mode control module 32 controls the values of $t_{ind}$ and $f_{ind}$, not the operator.

Figure 6:
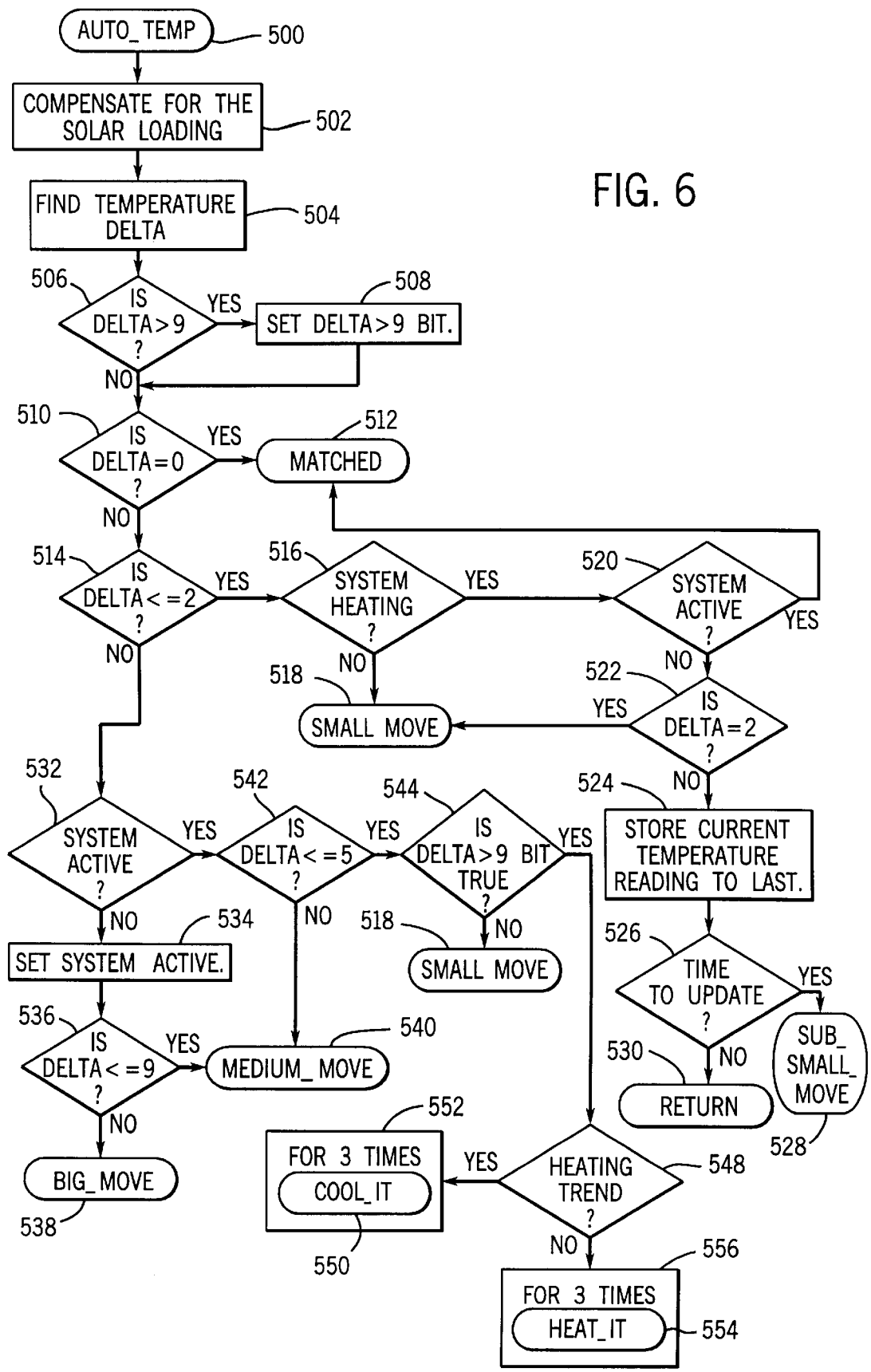
FIG. 6 is a logic flow diagram of the main routine for regulating the cab air temperature.

Turning now to FIG. 6, which shows a global view of the logic flow diagram for auto_temp routine 500, the routine starts with a step 502 which compensates for the solar loading the operator is feeling. More specifically, $t_{ind}$ (initialized to the row corresponding to $t_{set}$ at power-up) is decreased by the goal offset amount computed by solar_offset routine 300. In a step 504, the temperature differential $t_{dif}$ is calculated by subtracting $t_{cab}$ (i.e., the measured temperature) from $t_{set}$ (i.e., the desired temperature). If $t_{cab}$ is greater than $t_{set}$ the too_hot bit is set to true and the values are swapped before calculating $t_{dif}$ so that $t_{dif}$ remains a positive value. Alternatively, if $t_{cab}$ is less than $t_{set}$, the too_cold bit is set to true. In a step 506, the routine checks whether $t_{dif}$ is greater than 9 and, if yes, a $t_{dif>9}$ bit is set to true at a step 508. The routine then checks at a step 510 whether $t_{dif}$ is 0 and, if yes, the routine jumps to a matched subroutine 512. If $t_{dif}$ is not 0, a step 514 checks whether $t_{dif}$ is less than or equal to 2 and, if yes, a step 516 checks whether system 28 is in heating mode. System 28 is defined to be in heating mode when water butterfly valve 62 is more than 10% open as indicated by valve position sensor 80. From step 516, if system 28 is not in heating mode, the routine jumps to a small_move subroutine 518. If system 28 is in heating mode, a step 520 checks whether a system_active bit (initialized to false at power-up) is true and, if yes, the routine jumps to matched subroutine 512. Alternatively, if the system_active bit is still false, a step 522 checks whether $t_{dif}$ is equal to 2 and, if yes, the routine jumps to small_move subroutine 518. If $t_{dif}$ is not 2 (i.e., $t_{dif}$<2), the current cab temperature $t_{cab}$ is stored at a step 524, and a step 526 then determines whether the 10 second delay timer has elapsed. If yes, the routine jumps to a sub_small_move subroutine 528 and, if not, the routine returns at 530.

Referring back to step 514, the routine continues with a step 532 if $t_{dif}$ is not less than or equal to 2 (i.e., $t_{dif}$>2). Step 532 checks whether the system_active bit is true, and if not, a step 534 sets it to true. In a following step 536, if $t_{dif}$ is greater than 9 the routine jumps to a big_move subroutine 538, and otherwise the routine jumps to a medium_move subroutine 540. From step 532, if the system_active bit is true, a step 542 checks whether $t_{dif}$ is greater than 5 and, if yes, the routine jumps to medium_move subroutine 540. If $t_{dif}$ is less than or equal to 5, the $t_{dif}$>9 bit is then checked at a step 544 to determine whether a large temperature differential (i.e., greater than 9° F. ) existed at some point previously. If not, the routine jumps to small_move subroutine 518 and, if yes, a step 548 checks whether the heating trend bit was set to true by cab_probe routine 400. If the heating_trend bit is true, a cool_it subroutine 550 is called 3 consecutive times at 552, and otherwise a heat it subroutine 554 is called 3 times at 556.

Figure 7:
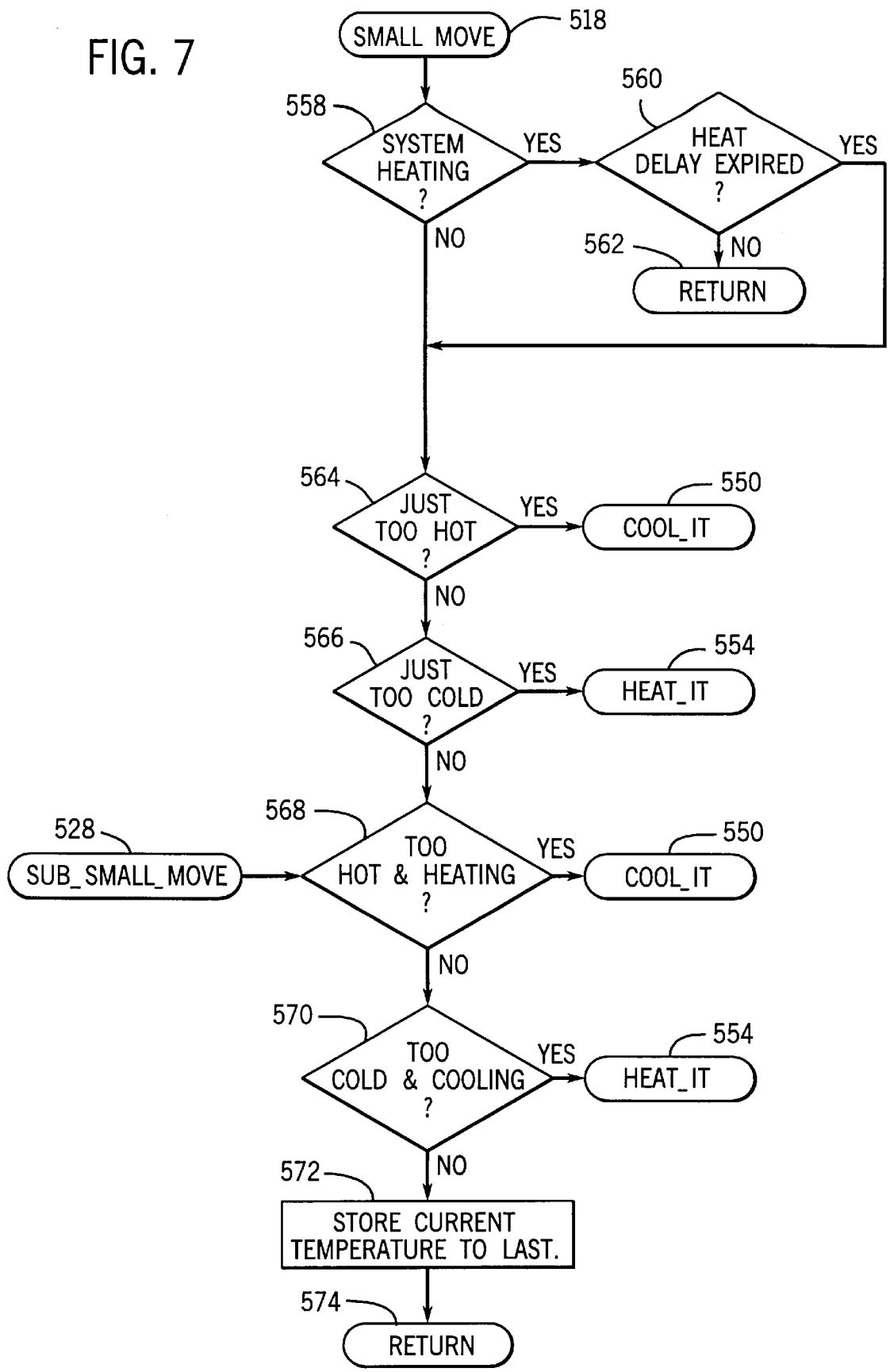
FIG. 7 is a logic flow diagram of a subroutine for implementing a small or sub_small change in the cab air temperature.

Turning now to FIG. 7, small_move subroutine 518 starts with a step 558 which checks whether system 28 is in heating mode. If system 28 is in heating mode, a step 560 checks whether the heat delay has expired (i.e., whether the 60 second wait timer has elapsed) and, if not, the subroutine returns at 562. Otherwise, subroutine 518 continues with a step 564 which jumps to cool_it subroutine 550 when the too_hot bit is true and the remaining heating and cooling bits (namely, heating_trend, too_cold and cooling_trend) are false. Otherwise, the subroutine continues with a step 566 which jumps to heat_it subroutine 554 when the too_cold bit is true and the remaining heating and cooling bits are false. Otherwise, the subroutine continues with a step 568, which step is also the initial step for sub_small_move subroutine 528. That is, the portion of subroutine 518 starting with step 568 is shared with subroutine 528. Step 568 jumps to cool_it subroutine 550 when the too_hot and heating_trend bits are true. Otherwise, a subsequent step 570 jumps to heat_it subroutine 554 if the too_cold and cooling_trend bits are true. If none of the above jump instructions are executed, the cab air temperature $t_{cab}$ is stored at a step 572, and the subroutines return at 574.

Figure 8:
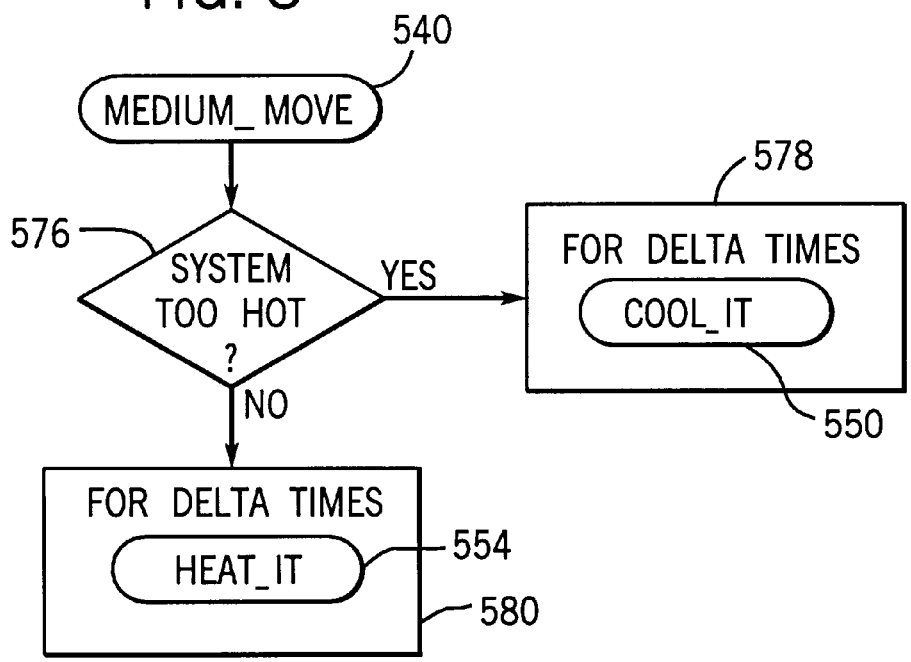
FIG. 8 is a logic flow diagram of a subroutine for implementing a medium change in the cab air temperature.

Referring now to FIG. 8, medium_move subroutine 540 begins with a step 576 which checks whether the too_hot bit is true. If yes, cool_it subroutine 550 is repeatedly called $t_{dif}$ times at 578 and, if not, heat_it subroutine 554 is repeatedly called $t_{dif}$ times at 580.

Figure 9:
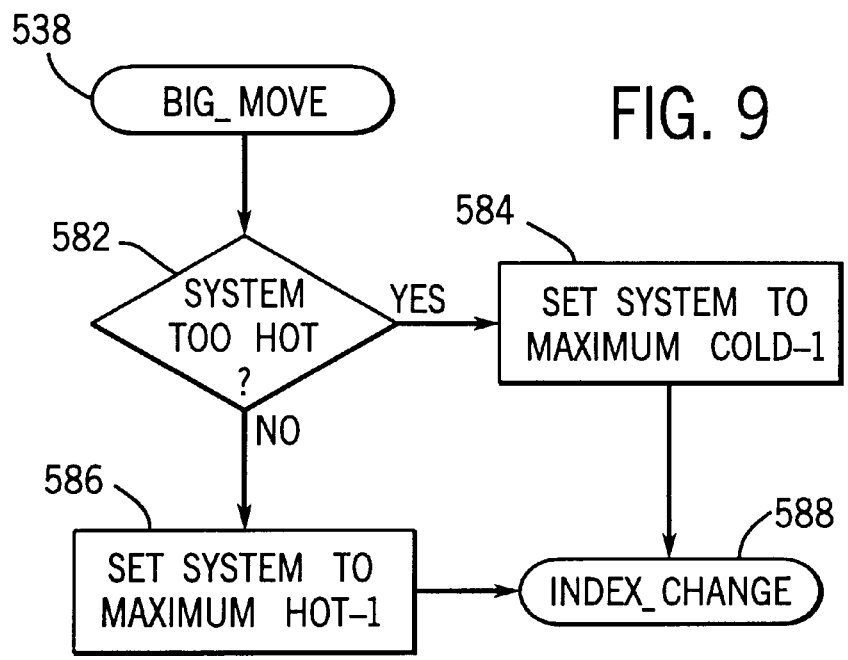
FIG. 9 is a logic flow diagram of a subroutine for implementing a big change in the cab air temperature.

Turning now to FIG. 9, big_move subroutine 538 initially checks at a step 582 whether the too_hot bit is true. If yes, a step 584 sets $t_{ind}$ to maximum cold-1 (i.e., $t_{ind}$ is set to 0) and, if not, a step 586 sets $t_{ind}$ to maximum hot-1 (i.e., $t_{ind}$ is set to 46). In either case, the subroutine next jumps to an index change subroutine 588. Index_change subroutine 588 restarts the 60 second heating mode delay timer at a step 590, stores the cab air temperature $t_{cab}$ at a step 592, and then returns at 594 (see FIG. 10).

Figure 11:
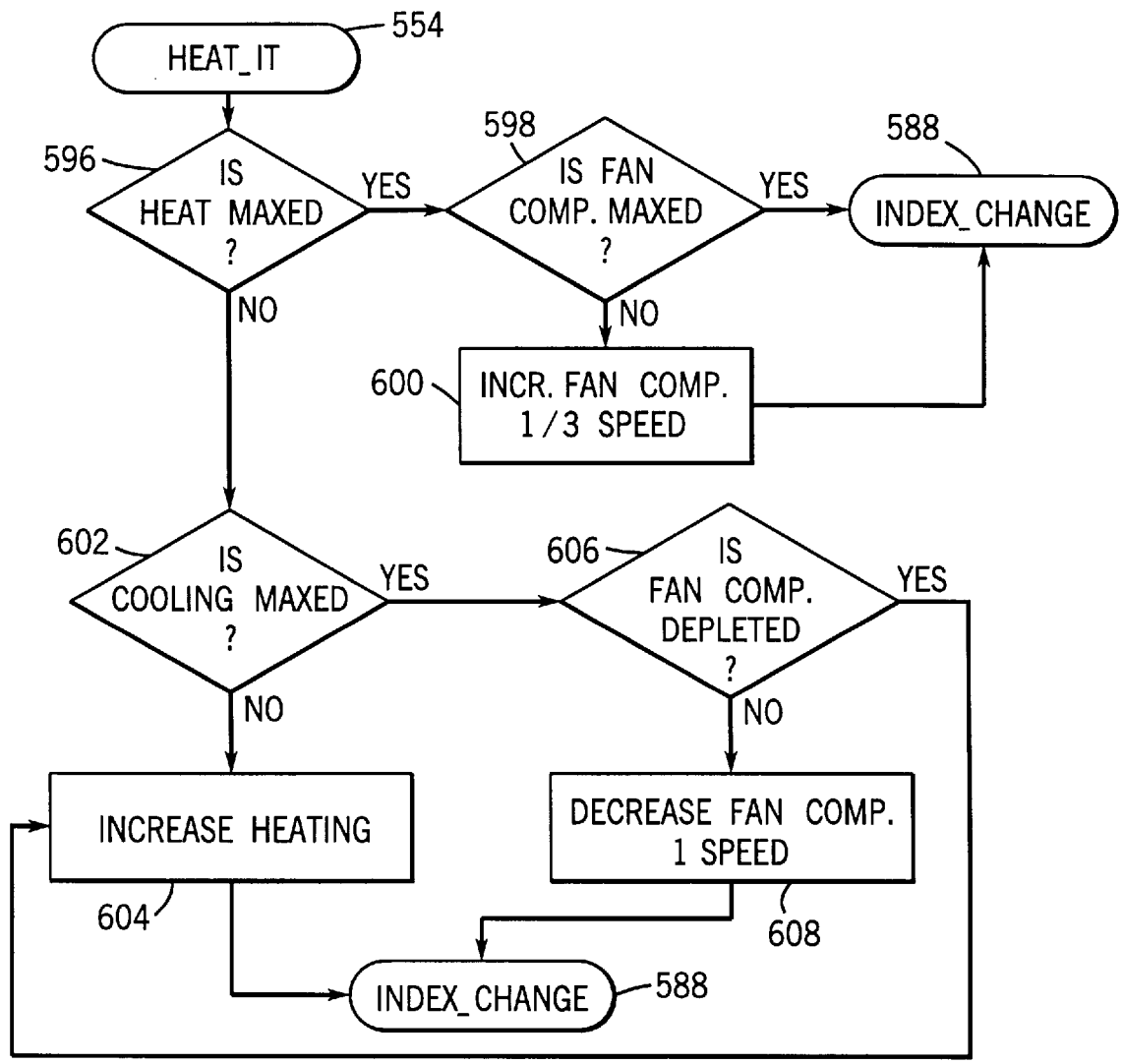
FIG. 11 is a logic flow diagram of a subroutine for increasing the cab air temperature.
Figure 12:
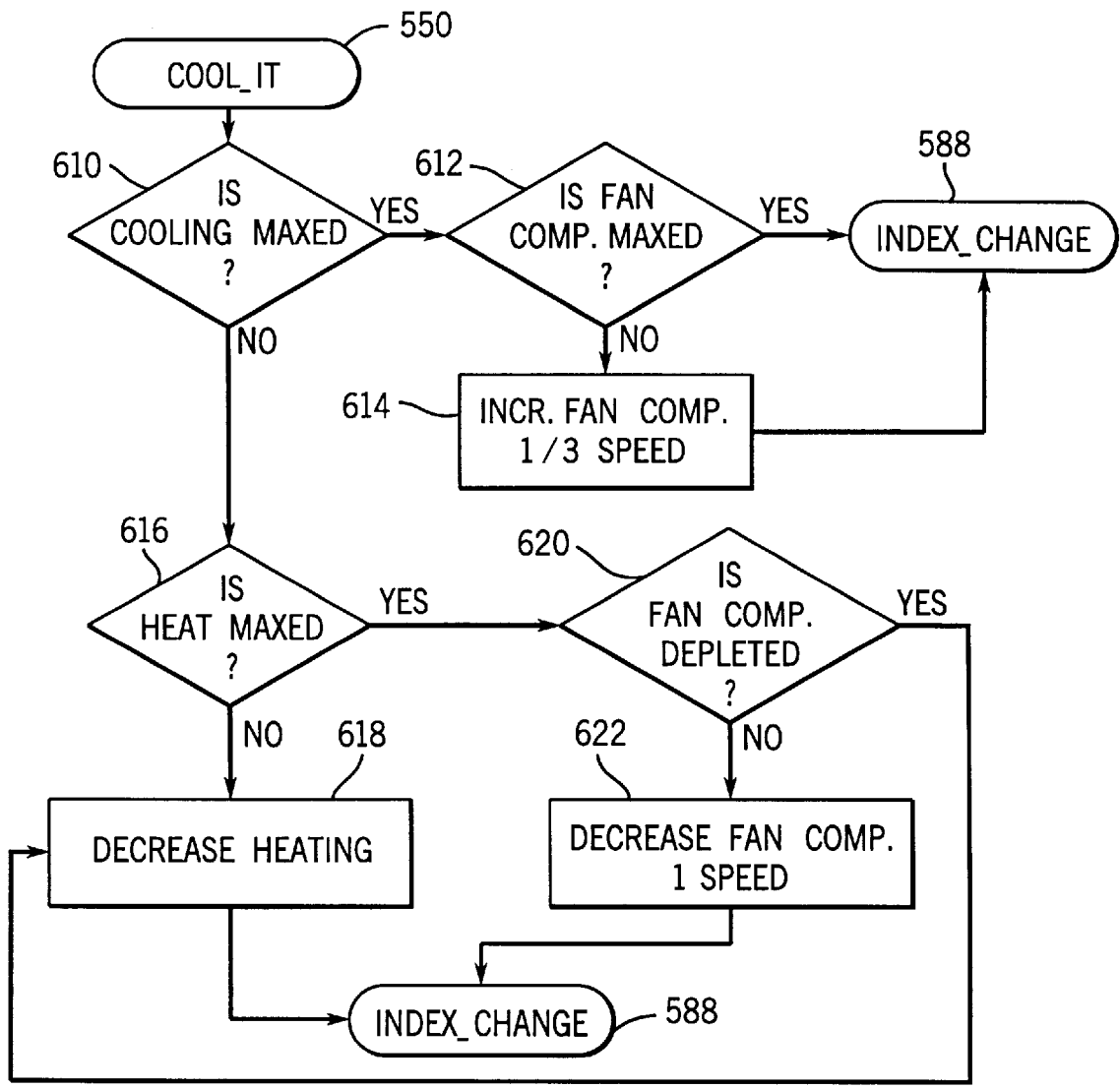
FIG. 12 is a logic flow diagram of a subroutine for decreasing the cab air temperature.
Figure 13:
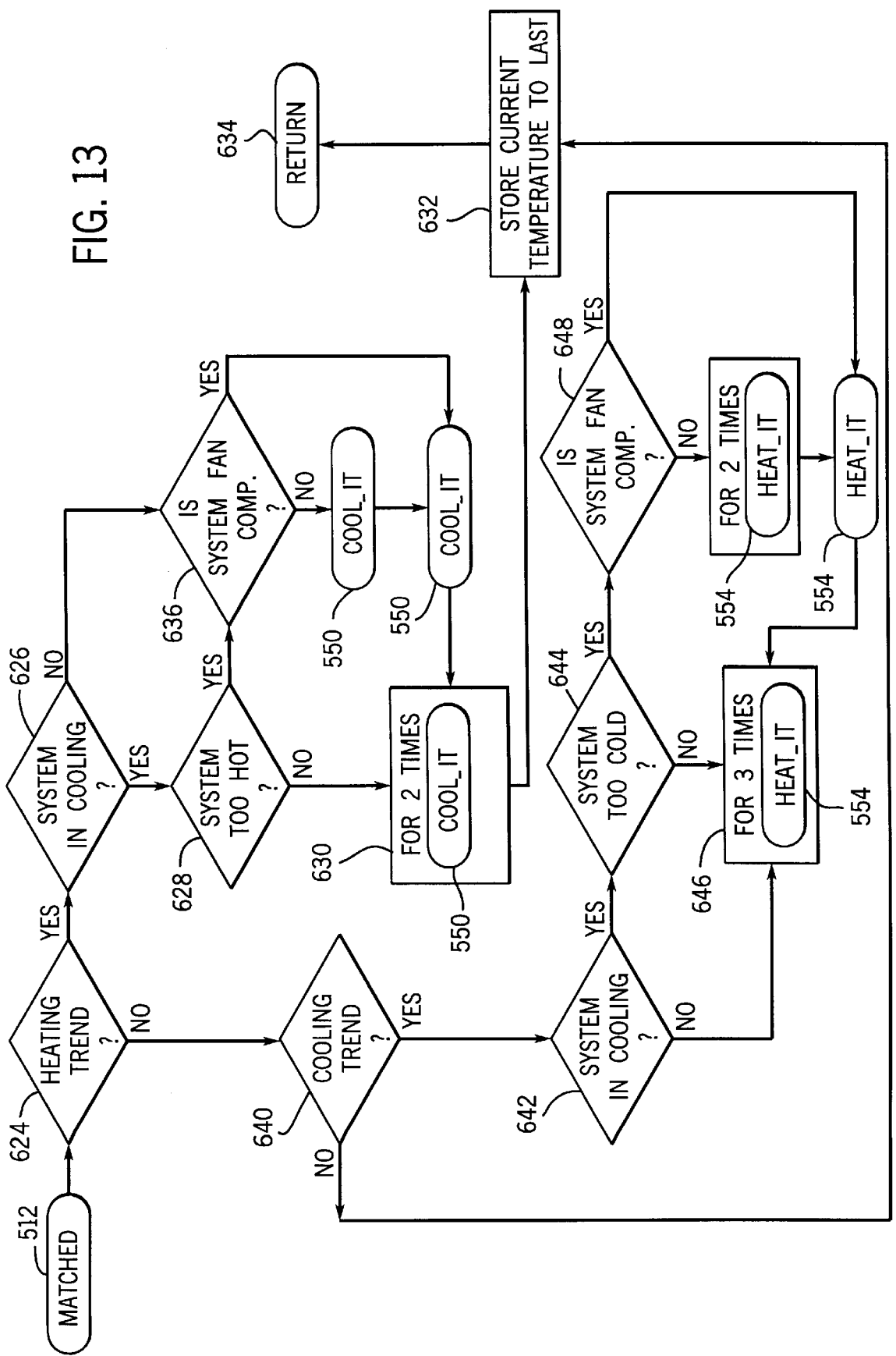
FIG. 13 is a logic flow diagram of a subroutine for reducing overshoot and oscillations when the cab air temperature is about equal to the desired cab temperature.

Referring now to FIGS. 11–13, heat_it subroutine 554, cool_it subroutine 550, and matched subroutine 512 will be described. Turning first to FIG. 11, heat_it subroutine 554 starts with a step 596 which checks whether the heat is maximized (i.e., whether $t_{ind}$=46). If the heat is maximized, a subsequent step 598 checks whether the fan compensation $f_{comp}$ (initialized to 0 at power-up) is maximized (i.e., whether $f_{ind}$ =46). If yes, the subroutine jumps to index_change subroutine 588 and, if not, the fan compensation $f_{comp}$ is increased by 1 at a step 600 before the routine jumps to index_change subroutine 588. Note that increasing $f_{comp}$ by 1 has the effect of increasing the fan speed by ⅓ (i.e., the fan speed will increase once for every 3 increases of $f_{comp}$) because the above table maps three sequential potentiometer voltages to each of the 14 available blower speeds. From step 596, if the heat is not maximized (i.e., $i_{temp}$<46), a step 602 then checks whether the cooling is maximized (i.e., whether $i_{temp}$=0) and, if not, $i_{temp}$ is increased by 1 at a step 604 and the subroutine then jumps to index_hange subroutine 588. If the cooling is maximized (i.e., $i_{temp}$=0), the routine proceeds from step 602 to a step 606 which checks whether the fan compensation is depleted (i.e., whether $f_{comp}$=0) and, if not, $f_{comp}$ is decreased by 3 (subject to a minimum value of 0) at a step 608 and the subroutine then jumps to index_change subroutine 588. If the fan compensation $f_{comp}$ is depleted, the subroutine proceeds from step 606 to step 604.

Turning next to FIG. 12, cool_it subroutine 550 starts with a step 610 which checks whether the cooling is maximized (i.e., whether $i_{temp}$=0). If the cooling is maximized, a subsequent step 612 checks whether the fan compensation index $f_{comp}$ is maximized. If yes, the subroutine jumps to index_change subroutine 588 and, if not, the fan compensation $f_{comp}$ is increased by 1 (i.e., the fan speed is increased by ⅓) at a step 614 before the subroutine jumps to index_change subroutine 588. From step 610, if the cooling is not maximized (i.e., $i_{temp}$>0), a step 616 then checks whether the heat is maximized (i.e., whether $i_{temp}$=46) and, if not, $i_{temp}$ is decreased by 1 at a step 618 and the subroutine then jumps to index_change subroutine 588. If the heat is maximized (i.e., $i_{temp}$=46), the subroutine proceeds with a step 620 which checks whether the fan compensation is depleted (i.e., whether $f_{comp}$ =0) and, if not, $f_{comp}$ is decreased by 3 at a step 622 and the subroutine then jumps to index_hange subroutine 588. If the fan compensation $f_{comp}$ is depleted, the subroutine proceeds from step 620 to step 618.

Turning now to FIG. 13, matched subroutine 512 begins with a step 624 which checks whether the heating_trend bit was set to true by cab_probe routine 400 and, if yes, a step 626 checks whether system 28 is in cooling mode. System 28 is defined to be in cooling mode when water butterfly valve 62 is less than 10% open as indicated by valve position sensor 80. If system 28 is in cooling mode, a step 628 checks whether the too_hot bit is true and, if not, cool_it subroutine 550 is called twice at 630, the cab air temperature is then stored at a step 632, and the subroutine then returns at 634. From step 628, if the too_hot bit is true, the subroutine proceeds to a step 636 which checks whether the fan is being compensated (i.e., whether $f_{comp}$ >0). If yes, cool_it subroutine 550 is called a total of three times before proceeding with step 632, and otherwise cool_it subroutine 550 is called a total of four times before proceeding to step 632.

Referring back to step 624, if the heating_trend bit is false, subroutine 512 continues with a step 640 which checks whether the cooling_trend bit is true. If not, the cab air temperature $t_{cab}$ is neither heating nor cooling, and the subroutine proceeds directly to step 632. Otherwise, the cab air temperature $t_{cab}$ is decreasing, and a step 642 checks whether system 28 is in cooling mode. If the system is in cooling mode, a step 644 checks whether the too_cold bit is true. If not, heat_it subroutine 554 is called three consecutive times at 646, and the subroutine proceeds to step 632. If the too_cold bit is true, the subroutine proceeds from step 644 to a step 648 which checks whether the fan is being compensated (i.e., whether $f_{comp}$>0). If yes, heat it subroutine 554 is called a total of four times before proceeding to step 632, and otherwise heat_it subroutine 554 is called a total of five times before proceeding to step 632.

Figure 14:
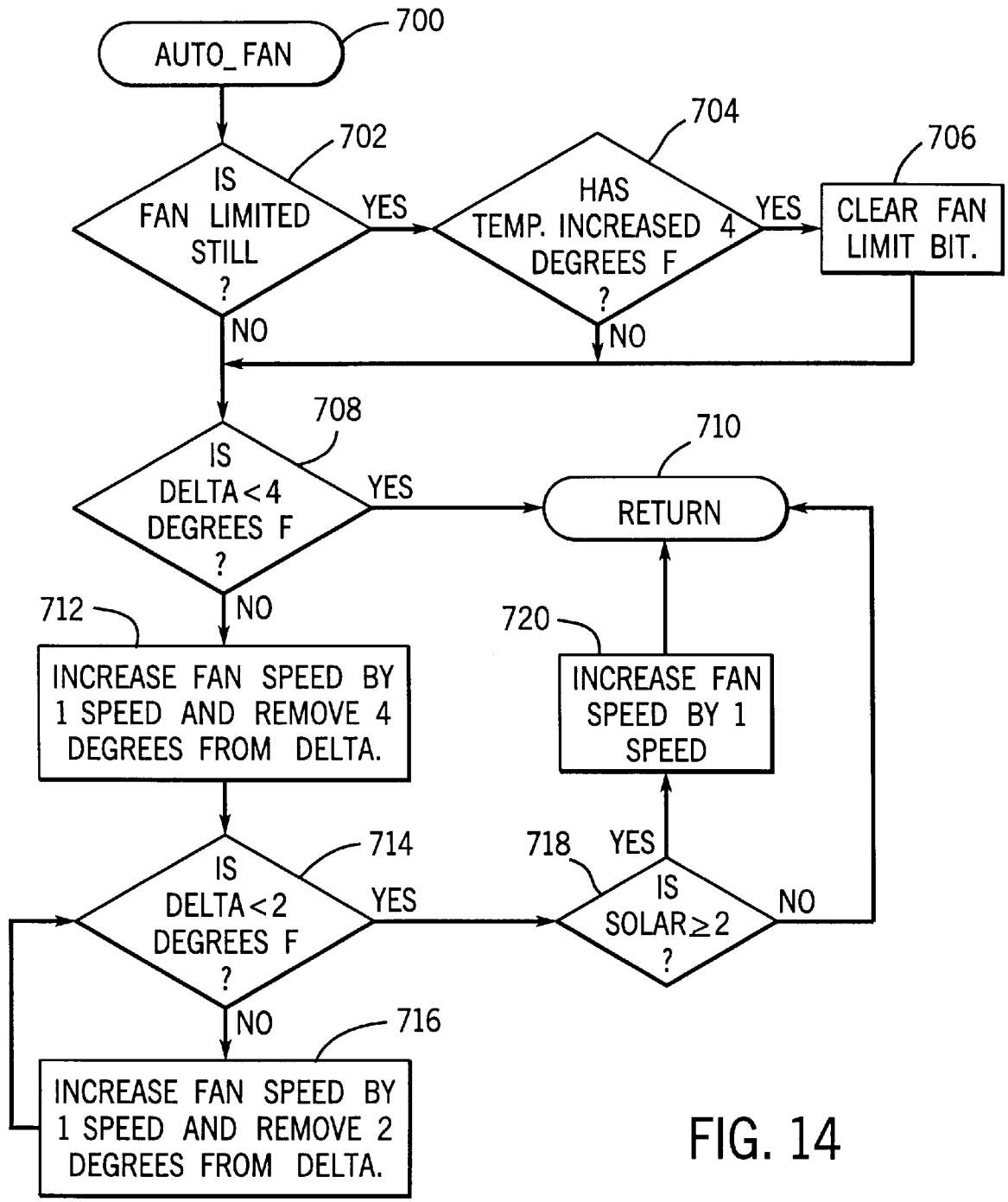
FIG. 14 is a logic flow diagram of a routine for increasing the blower speed above the manually set blower speed.

Turning now to FIG. 14, auto_fan routine 700 starts with a step 702 which checks whether a fan_limit bit (initialized to true at powered up) is still set. If yes, a step 704 checks whether the cab air temperature is at least 4° F. more than the cab air temperature measured when system 28 was first powered up. If the cab air temperature has increased by at least 4° F., the fan_limit bit is cleared at a step 706. The routine then proceeds to a step 708 which checks whether $t_{dif}$ is less than 4 and, if yes, the routine returns at 710. If not, a step 712 increases the fan speed by 1 speed (i.e, $f_{comp}$ is increased by 3, subject to the maximum) and decreases $t_{dif}$ by 4. The routine then iterates between a step 714 and a step 716. Specifically, step 714 repeatedly checks whether $t_{dif}$ is less than 2 and, if yes, the routine exits the loop and proceeds to a step 718 but, if not, step 716 increases the fan speed by 1 (i.e., $f_{comp}$ is increased by 3) and decreases $t_{dif}$ by 2. At step 718, if the current goal offset is 2 or greater, the subroutine returns at 210, and otherwise the fan speed is increased by 1 (i.e., $f_{comp}$ is increased by 3) at a step 720 before returning at 710.

Although the automatic temperature control (ATC) algorithm has been described with reference to logic flow diagrams, it will be understood that the conversion of the logic flow diagrams into a standard language for implementing in a microprocessor will be evident to those with ordinary skill in the art. Moreover, although the invention has been described with respect to particular embodiments, it will be understood that the invention is capable of modification and variation, and is limited only by the following claims. For example, the invention may be embodied in a vehicle supported by tracks extending around the vehicle wheels, or in a tractor. In addition, the ATC system could be an all digital system including digital operator input devices. Such other constructions are, nevertheless, considered within the scope of this invention. Accordingly, these and other substitutions, modifications, changes and omissions may be made in the design and arrangement of the control system as disclosed herein without departing from the scope of the appended claims.

What is claimed is:

1. An agricultural vehicle comprising:
   a frame supported by a plurality of wheels;
   an agricultural implement supported by the frame;
   an operator cab supported by the frame;
   a fluid source;
   a first heat exchanger located in the cab and configured to transfer varying amounts of heat energy;
   an electrically operated fluid control assembly including at least one electrical input and disposed to couple the fluid source to the heat exchanger to control a flow of fluid between the fluid source and the heat exchanger in response to electrical control signals applied to the electrical input;
   an operator control located in the cab and including an operator interface configured to produce a set-point signal representative of a desired cab temperature set by an operator at which the air in the cab is to be maintained and providing an output indicative thereof;
   at least one sensor disposed to sense at least one of an ambient air temperature, a cab air temperature and solar loading, and configured to produce at least one sensed signal representative thereof; and
   an interface circuit electromagnetically coupled to the fluid control assembly, the operator control and the at least one sensor, wherein the interface circuit produces a temperature difference based upon a comparison of the set-point signal to the at least one sensed signal and applies the electrical control signals to the fluid control assembly based upon the temperature difference to achieve the desired cab temperature and minimize cab air temperature oscillations.

2. The vehicle of claim 1, wherein the temperature difference is a function of the difference between the desired cab temperature and the sensed cab air temperature.

3. The vehicle of claim 2, wherein the at least one sensor includes a solar loading sensor and the temperature difference is further a function of the sensed solar loading.

4. The vehicle of claim 1, wherein the fluid control assembly includes a valve having a position feedback signal generator coupled to the interface circuit, and wherein the interface circuit applies the electrical control signals to the valve based upon a comparison of the feedback signals to the temperature difference.

5. The vehicle of claim 4, wherein the electrical control signals are based upon a magnitude of the temperature difference.

6. The vehicle of claim 4, wherein the fluid control assembly includes a fluid valve coupled to a motor driven positioner and the feedback position signal generator, the positioner being coupled to the interface circuit to control the flow of fluid through the valve based upon the electrical control signals.

7. The vehicle of claim 1, wherein the at least one sensor includes a solar loading sensor disposed within the cab at a location capable of being exposed to direct sunlight when the vehicle moves in a first direction but not in a second opposite direction.

8. The vehicle of claim 1, further comprising:
   a blower housing located in the cab including an air intake vent, the heat exchanger being located in the housing; and
   a variable speed blower located in the housing for taking in air through the intake vent and moving it over the heat exchanger and into the cab, the variable speed blower receiving blower control signals from the interface circuit based upon the temperature difference, the blower control signals instructing the blower to increase its speed above an operator set-point speed when the temperature difference increases above a pre-determined value.

9. The vehicle of claim 1, wherein the temperature difference is partly a function of a temperature trend of changes in the sensed cab air temperature.

10. An agricultural vehicle comprising:
    a frame supported by a plurality of wheels;
    an agricultural implement supported by the frame;
    an operator cab supported by the frame;
    an engine supported by the frame;
    a fluid source;
    a heat exchanger located in the cab and configured to transfer varying amounts of heat energy;
    an electrically operated fluid control assembly including at least one electrical input and disposed to couple the fluid source to the heat exchanger to control a flow of fluid between the fluid source and the heat exchanger in response to electrical control signals applied to the electrical input;
    an operator control located in the cab and including an operator interface configured to produce a set-point signal representative of a desired cab temperature set by an operator at which the air in the cab is to be maintained and providing an output indicative thereof;
    at least one sensor disposed to sense at least one of an ambient air temperature, a cab air temperature and solar loading, and configured to produce at least one sensed signal representative thereof; and
    an interface circuit electromagnetically coupled to the fluid control assembly, the operator control and the at least one sensor, wherein the interface circuit produces a temperature difference based upon a comparison of the set-point signal to the at least one sensed signal and applies the electrical control signals to the fluid control assembly based upon the temperature difference to achieve the desired cab temperature and minimize cab air temperature oscillations;
    wherein the fluid source is an air conditioning compressor operatively coupled to the engine, the fluid control assembly is a clutch assembly on the compressor electromagnetically coupled to the interface circuit, the heat exchanger is coupled to the compressor to provide a conduit for receiving a flow of fluid from the compressor, and the interface circuit applies a cooling control signal to the compressor clutch assembly based upon the temperature difference.

11. The vehicle of claim 10, further comprising a temperature sensor disposed adjacent to the heat exchanger and electromagnetically coupled to the interface circuit, the sensor producing a temperature signal representative of the temperature of the air adjacent the heat exchanger, and the interface circuit applying the cooling signal to the compressor clutch assembly based upon a comparison of the temperature signal to the temperature difference.

12. An agricultural vehicle comprising:

a frame supported by a plurality of wheels;

an agricultural implement supported by the frame; an operator cab supported by the frame, wherein the operator cab includes a roof, a floor, a pair of side windows and a front window supported between the roof and the floor;

a fluid source;

a heat exchanger located in the cab and configured to transfer varying amounts of heat energy;

an electrically operated fluid control assembly including at least one electrical input and disposed to couple the fluid source to the heat exchanger to control a flow of fluid between the fluid source and the heat exchanger in response to electrical control signals applied to the electrical input;

an operator control located in the cab and including an operator interface configured to produce a set-point signal representative of a desired cab temperature set by an operator at which the air in the cab is to be maintained and providing an output indicative thereof;

at least one sensor disposed to sense at least one of an ambient air temperature, a cab air temperature and solar loading, and configured to produce at least one sensed signal representative thereof, wherein the at least one sensor includes a cab air temperature sensor and a plurality of solar loading sensors, the solar loading sensors including one disposed near the floor facing the front window and one each near the floor facing each side window; and an interface circuit electromagnetically coupled to the fluid control assembly, the operator control and the at least one sensor, wherein the interface circuit produces a temperature difference based upon a comparison of the set-point signal to the at least one sensed signal and applies the electrical control signals to the fluid control assembly based upon the temperature difference to achieve the desired cab temperature and minimize cab air temperature oscillations.

13. An agricultural vehicle comprising;

a frame supported by a plurality of wheels;

harvesting means for harvesting vegetation, the harvesting means being supported by the frame;

an operator cab supported by the frame;

supply means for providing a source of fluid;

heat transfer means located in the cab for transferring energy between an interior and an exterior of the cab;

control means for coupling the heat transfer means to the supply means and controlling the flow of fluid to the heat transfer means in response to electrical control signals;

selector means located in the cab and operative upon selective movement by the user for producing a set-point signal representative of a desired cab temperature;

sensor means for sensing at least one of ambient air temperature, cab air temperature and solar loading, the sensor means generating at least one sensed signal representative thereof, the sensor means including at least one solar loading sensor disposed inside the cab to at a location to estimate a current solar load on the user's body; and interface means coupled to the control means, the selector means and the sensor means, the interface means operative for computing a temperature difference based upon a comparison of the set-point signal to the at least one sensed signal and for applying the electrical control signals to the control means based upon the temperature difference to achieve the desired cab temperature and minimize cab air temperature oscillations.

14. The vehicle of claim 13, wherein the temperature difference is a function of the difference between the desired cab temperature and the sensed cab air temperature, and the sensed solar loading is an additional factor in the function.

15. The vehicle of claim 13, wherein the control means is a valve including a position feedback signal generator coupled to the interface means, and the interface means applies electrical control signals to the valve means based upon a comparison of the feedback signals to the temperature difference.

16. The vehicle of claim 15, wherein the valve is coupled to a motor driven positioner and the feedback position signal generator, the positioner being coupled to the interface means to control the flow of fluid through the valve based upon the electrical control signals.

17. The vehicle of claim 13, further comprising:

a blower housing located in the cab including an air intake vent, the heat transfer means being located in the housing; and blower means located in the housing for taking in air through the intake vent and moving it over the heat transfer means and into the cab, the blower means receiving blower control signals from the interface circuit based upon the temperature difference, the blower control signals instructing the blower to increase its speed above an operator set-point speed when the temperature difference increases above a pre-determined value.

18. The vehicle of claim 13, wherein the temperature difference is partly a function of a temperature trend of changes in the sensed cab air temperature.

19. The vehicle of claim 13, wherein the operator cab includes a roof, a floor, a pair of side windows and a front window supported between the roof and the floor, and wherein the at least one sensor includes a cab air temperature sensor and a plurality of solar loading sensors, the solar loading sensors including one disposed near the floor facing the front window and one each near the floor facing each side window.

20. An agricultural vehicle comprising:

a frame supported by a plurality of wheels;

harvesting means for harvesting vegetation, the harvesting means being supported by the frame;

an operator cab supported by the frame:

an engine supported by the frame;

supply means for providing a source of fluid;

heat transfer means located in the cab for transferring energy between an interior and an exterior of the cab;

control means for coupling the heat transfer means to the supply means and controlling the flow of fluid to the heat transfer means in response to electrical control signals;

selector means located in the cab and operative upon selective movement by the user for producing a set-point signal representative of a desired cab temperature;

sensor means for sensing at least one of ambient air temperature, cab air temperature and solar loading, the sensor means generating at least one sensed signal representative thereof; and interface means coupled to the control means, the selector means and the sensor means, the interface means operative for computing a temperature difference based upon a comparison of the set-point signal to the at least one sensed signal and for applying the electrical control signals to the control means based upon the temperature difference to achieve the desired cab temperature and minimize cab air temperature oscillations;

wherein the fluid source is an air conditioning compressor operatively coupled to the engine, the control means is a clutch assembly on the compressor electromagnetically coupled to the interface means, the heat transfer means is coupled to the compressor to receive the flow of fluid from the compressor, and the interface means applies a cooling control signal to the compressor clutch assembly based upon the temperature difference.

21. The vehicle of claim 20, further comprising a temperature sensor disposed adjacent to the heat transfer means for producing a temperature signal representative of the temperature of the air adjacent the heat transfer means, the interface means applying the cooling signal to the compressor clutch assembly based upon a comparison of the temperature signal to the temperature difference.

22. An off-road vehicle comprising:

a frame supported by a plurality of wheels;

an operator cab supported by the frame;

a heated liquid source;

a first heat exchanger located in the cab and configured to output varying amounts of heat energy;

an electrically operated valve assembly including at least one electrical input and disposed to couple the liquid source to the heat exchanger, the valve controlling a flow of heated liquid from the source to the heat exchanger in response to electrical control signals applied to the electrical input;

an operator control located in the cab and including an operator interface configured to produce a set-point signal representative of a desired cab temperature set by an operator at which the air in the cab is to be maintained and providing an output indicative thereof;

at least one sensor disposed to sense at least one of an ambient air temperature, a cab air temperature and solar loading, and configured to produce at least one sensed signal representative thereof; and an interface circuit electromagnetically coupled to the valve assembly, the operator control and the at least one sensor, the interface circuit producing a temperature delta based upon a comparison of the set-point signal to the at least one sensed signal and applying the electrical control signals to the valve based upon the temperature delta to achieve the desired cab temperature and minimize cab air temperature oscillations.

23. The vehicle of claim 22, wherein the temperature delta is a function of a difference between the desired cab temperature and the sensed cab air temperature, and wherein the at least one sensor includes a solar loading sensor and the sensed solar loading is an additional factor in the function.

24. The vehicle of claim 23, wherein the valve assembly further includes a position feedback signal generator coupled to the interface circuit, and the interface circuit applies electrical control signals to the valve assembly based upon a comparison of the feedback signals to the temperature delta.

25. The vehicle of claim 24, wherein the valve assembly includes a fluid valve coupled to a motor driven positioner and the feedback position signal generator, the positioner being coupled to the interface circuit to control the flow of fluid through the valve based upon the electrical control signals.

26. The vehicle of claim 22, further comprising:

an engine supported by the frame;

an air conditioning compressor operatively coupled to the engine by a clutch assembly electromagnetically coupled to the interface circuit; and a second heat exchanger located in the cab and coupled to the compressor to provide a conduit for receiving a flow of cooling fluid from the compressor;

wherein the interface circuit applies a cooling request signal to the compressor based upon the temperature delta.

27. The vehicle of claim 26, further comprising a temperature sensor disposed adjacent to the second heat exchanger and electromagnetically coupled to the interface circuit, the temperature sensor producing a temperature signal representative of the temperature of the air adjacent the second heat exchanger, and the interface circuit applying the cooling signal to the compressor clutch assembly based a comparison of the temperature signal to the temperature delta.

28. The vehicle of claim 22, further comprising a harvesting implement supported by the frame and a solar loading sensor disposed within the cab, wherein the vehicle moves in a first direction when the implement is operational for harvesting, and wherein the solar loading sensor is capable of detecting radiant sunlight passing through a front window of the cab when the vehicle is moving in the first direction towards the sun but not when the vehicle is moving in the first direction away from the sun.

29. The vehicle of claim 28, wherein the vehicle further includes solar loading sensors disposed within the cab for sensing radiant sunlight passing through side windows of the cab when the vehicle is moving towards the sun or at an angle to the sun.

30. The vehicle of claim 29, wherein the solar loading sensors disposed to sense radiant sunlight passing through the side windows are mounted higher than the solar loading sensor disposed to sense radiant sunlight passing through the front window.

* * * * *